Feb. 3, 1953 C. B. H. FELDMAN 2,627,574

RADIO REPEATER HAVING A PULSE REGENERATOR

Filed July 11, 1950 5 Sheets-Sheet 1

INVENTOR
C. B. H. FELDMAN
BY H. A. Burgess
ATTORNEY

RADIO REPEATER HAVING A PULSE REGENERATOR

Filed July 11, 1950 5 Sheets-Sheet 2

INVENTOR
C. B. H. FELDMAN
BY H. A. Burgess
ATTORNEY

INVENTOR
C. B. H. FELDMAN
BY H. A. Burgess
ATTORNEY

Feb. 3, 1953 C. B. H. FELDMAN 2,627,574

RADIO REPEATER HAVING A PULSE REGENERATOR

Filed July 11, 1950 5 Sheets-Sheet 4

INVENTOR
C. B. H. FELDMAN
BY H. A. Burgess
ATTORNEY

Feb. 3, 1953 C. B. H. FELDMAN 2,627,574

RADIO REPEATER HAVING A PULSE REGENERATOR

Filed July 11, 1950 5 Sheets-Sheet 5

INVENTOR
C. B. H. FELDMAN
BY H. A. Burgess
ATTORNEY

UNITED STATES PATENT OFFICE 2,627,574

RADIO REPEATER HAVING A PULSE REGENERATOR

Carl B. H. Feldman, Summit, N. J., assignor to Bell Telephone Laboratories, Incorporated, New York, N. Y., a corporation of New York Application July 11, 1950, Serial No. 173,187

12 Claims. (Cl. 250—15)

This invention relates to signal regeneration and, more particularly, to circuits for the regeneration of microwave pulses. These circuits may comprise circulating pulse regenerators similar to the circulating pulse generators described in a copending application of C. C. Cutler, Serial No. 118,889, dated September 30, 1949.

It is an object of the invention to periodically gate and amplify a short segment of an input signal under the control of a recurrently varying control wave.

It is also an object of this invention to regenerate microwave pulses.

A further object of the invention is to determine from a microwave signal modulated by recurrent pulses and spaces, which of the incoming signals are more likely to have been pulses and which were more likely to have been spaces. Further, it is an object to increase those signals which are determined to be pulses to a uniform amplitude and to reduce all others to zero. It is also an object of the invention to retime the signal pulses.

Another object of the invention is to gate a short representative segment of an incoming signal at the mid-period of each nominal occurrence time into a regenerative repeater and then to gate the segment into an output circuit after it has been allowed to circulate through the pulse regenerator for a predetermined number of times.

A more specific object of the invention is to perform the gating functions in a regenerative pulse repeater with sinusoidally varying control waves.

A circulating pulse regenerator is a loop circuit which, in one embodiment, comprises an expander, a limiter, an amplifier, a filter, and a delay circuit. Pulses circulating in the loop will be sharpened by the expander which increases the amplitude of high level signals relative to low levels and will be limited at a peak amplitude established by the limiter. The amplifier is adjusted to give the loop unity gain for a nominal pulse amplitude so that pulses of that amplitude will tend to circulate indefinitely unless removed from the loop. The delay circuit controls the time required for a pulse to circulate through the loop.

Systems wherein complex wave forms such as speech are transmitted by pulses, for example, binary systems wherein the intelligence to be communicated is represented by pulses and spaces arranged in accordance with a particular code, are now well known in the art. In binary systems, the pulses are originated with a uniform amplitude, since it is necessary at a receiver to detect only the presence or absence of a pulse during a particular interval of time. Due to noise and other interference, however, the pulses may become varied in amplitude and the spaces may be replaced by an appreciable signal. It is, therefore, desirable at a repeater or relay to return the pulses to a uniform amplitude and to attenuate the signal during spaces to substantially zero so that the pulses may acquire new noise disturbances in transmission to the succeeding repeater, without retaining the disturbance acquired in the preceding transmission path.

A pulse repeater in accordance with a specific embodiment of the invention takes a very short sample of the incoming signal proportional to its amplitude at the mid-period of the nominal pulse occurrence time. If the signal from which the sample is taken originated as a pulse, it is probable that, at the repeater, it will be more than one-half of its original standard amplitude. Conversely, if it originated as a space, it is equally probable that the sample will be less than one-half of a standard pulse amplitude. This, of course, assumes that the chosen standard amplitude is sufficient to give a minimum signal-to-noise ratio of six decibels for most transmission conditions. The repeater is therefore designed to amplify all samples of greater than the half-standard amplitude and attenuate all others. The elements which perform these operations will usually not increase the pulses to standard amplitude or attenuate the noise to zero in one operation on the sample. Therefore, the samples are subjected to the reshaping operation more than once by circulating them through the pulse regenerator for a sufficient number of times to perform the required reshaping. A limiter is included in the regenerator circuit to standardize the amplitude of the reshaped pulses. Timing circuits are provided to introduce the samples into the circulating regenerator and to abstract the reshaped pulses after their predetermined number of trips through the loop.

A regenerative repeater of the type to which the present invention is applicable is described in a copending application of which I am a joint inventor, Serial No. 176,238, filed July 27, 1950. In the repeaters therein described, the input, output, and blanking gates are operated by pulses which are generated under the control of a sinusoidally varying wave whose frequency is accurately determined by the average repetition rate of the incoming pulses. In accordance with a specific embodiment of the present invention, which will be described hereinafter in detail, the gating functions are performed entirely by sinusoidally varying control waves so that circuits capable of handling extremely short base band pulses are unnecessary. This and other features of the invention will be better understood by a consideration of the following detailed description when read in accordance with the attached drawings, in which:

Figure 1:
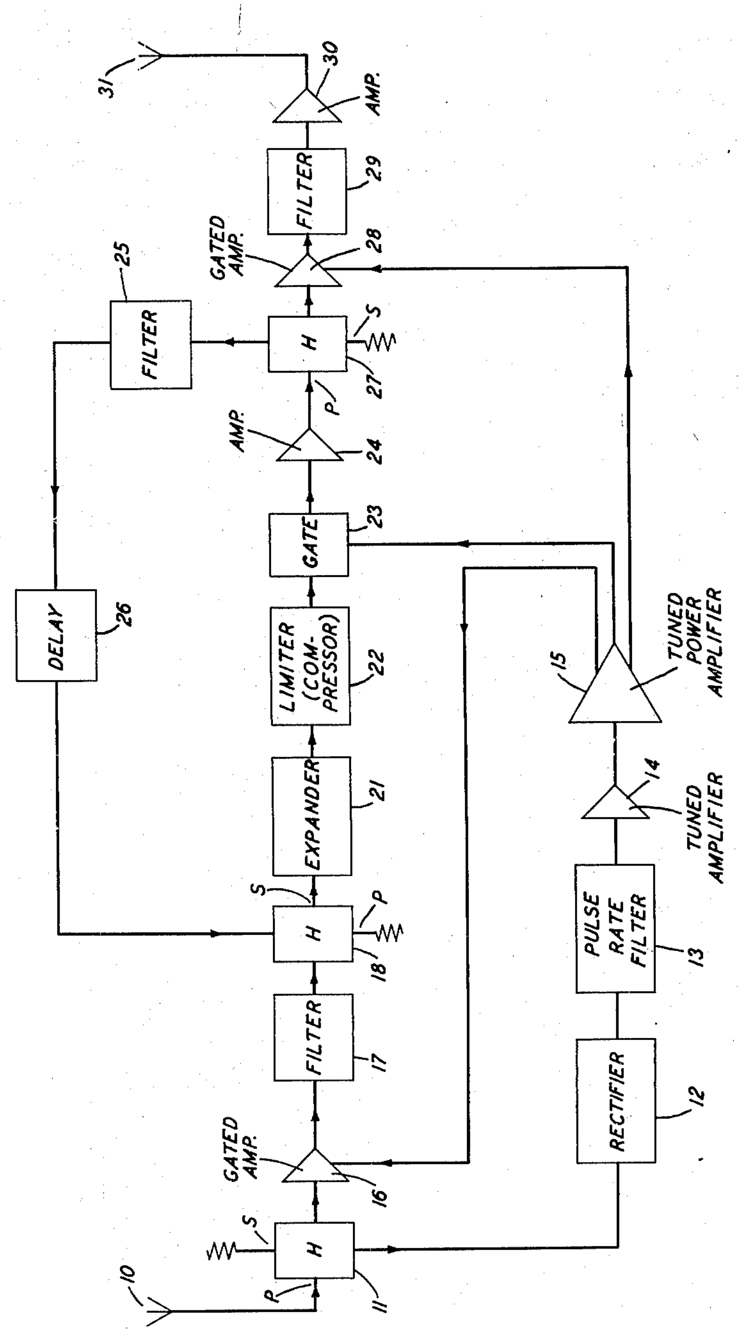
Fig. 1 is a block schematic diagram of a repeater illustrative of the present invention.

The general operation of a specific repeater illustrative of the present invention will now be described with particular reference to Fig. 1. The incoming signal comprising pulses and spaces arranged in any arbitrary order is received by the antenna 10 and passes into the hybrid junction 11. Although the signal was originated with pulses of a uniform amplitude, the signal, when received at the repeater, may be distorted by noise, for example, and appear as shown in wave form I of Fig. 5. Half of the power entering the hybrid junction 11 is applied to a timing circuit which comprises the rectifier 12, a pulse rate filter 13, an amplifier 14, and a tuned power amplifier 15. The filter 13 is a narrow band-pass filter tuned to the nominal pulse repetition rate of the incoming signal, and its output will be a sine wave whose frequency is accurately determined to be the average repetition frequency of the input pulses. The sine wave output of filter 13 controls the generation of three sinusoidally varying control waves by the tuned power amplifier 15. The sine waves developed by amplifier 15 each have the same frequency as the sinusoidal output of filter 13 but are displaced in time by any means well known in the art for reasons which will subsequently become apparent.

The power entering hybrid junction 11, which is not applied to the timing circuit, is applied to the input of gated ampifier 16. The gate 16 is normally closed but is opened for a relatively small portion of a pulse period at the mid-period of the norminal pulse occurrence time by the first of the three aforementioned sinusoidally varying control waves. ("Pulse period" is herein defined as the nominal time between adjacent pulse centers.) A narrow segment of the incoming signal is thus gated and amplified by amplifier 16 at each pulse occurrence time. A narrow segment of the incoming signal will also be gated by amplifier 16 mid-way between each pulse occurrence time as will hereinafter be explained. However, the latter segment will differ in frequency from the segment occurring at the nominal pulse occurrence time so that only the first-mentioned segment, which is the more representative of the originally transmitted signal, will be passed by filter 17 and applied to hybrid junction 18. Hybrid junction 18 comprises the input of the circulating pulse regenerator.

The circulating pulse regenerator comprises the expander 21, limiter 22, blanking gate 23, amplifier 24, filter 25, and delay circuit 26. The order in which the elements of the loop circuit are connected together may be varied and, as shown, is illustrative only. Further, the desired characteristics of the loop elements may be embodied in a lesser or a greater number of devices than that shown. As previously explained, the expander increases the amplitude of all pulses greater than a predetermined amplitude relative to all others. In the present illustrative embodiment, the expander is adjusted to increase all pulses of greater than one-half of a standard amplitude of the originally transmitted pulse. The limiter 22 will determine the peak amplitude to which the circulating pulses can be increased by the expander, and the amplifier 24 supplies sufficient gain to compensate for the losses of the loop so that the loop will have unity gain for pulses of one-half standard amplitude. The blanking gate 23 insures that the segments are removed from the loop after their predetermined number of trips through the loop. Filter 25 is a broad-band device denoting the selectivity of the entire loop circuit. The delay circuit 26 controls the period of the circulating pulses and hence controls the time that a pulse will return to the point of its injection into the loop, namely, the hybrid junction 18.

Hybrid junction 27 comprises the output of the circulating pulse regenerator and applies a portion of the circulating pulses to the gated amplifier 28. Gated amplifier 28 is normally closed, as is the input gating amplifier 16. However, under the control of the third of the sinusoidally varying control waves, the gate 28 is opened when a pulse segment which has completed the predetermined number of trips through the expander, limiter, and amplifier appears in the hybrid junction 27 so that the reshaped pulse is amplified and gated into the output. The filter 29 reshapes the pulses by broadening the narrow pulse segments and applies them through amplifier 30 to the antenna 31 for transmission. It also rejects the undesired segments gated out mid-way between the wanted pulses, as discussed in connection with filter 17.

After a pulse segment has been gated out of the loop, a portion of it will continue to circulate in the loop. However, the blanking gate 23 under the control of the second of the sinusoidally varying control waves attenuates the unwanted pulses so that they are completely removed from the loop.

As previously mentioned, the pulse segments are recirculated through the reshaping portions of the loop circuit viz., the expander, limiter and amplifier 24 to insure that the pulses are increased to the standard amplitude determined by the limiter 22 and to attenuate the noise to zero. If the total delay of the loop is less than one pulse period, it is theoretically possible to recirculate the pulse through the expander, limiter, and amplifier without the intervention of a subsequent pulse. For example, if the total loop delay is equal to one-tenth of a pulse period and if the sample taken from the incoming pulse is equal to or shorter than one-tenth of a pulse period, a pulse segment may make ten trips through the loop without interfering with a subsequent pulse.

At microwave frequencies, it may be impossible to attain such short delays with traveling-wave amplifiers, in which case it may be advisable to adjust the loop delay by means of the delay circuit 25 to make it greater than a pulse period, for example, 1.1 periods. Ten trips through the loop without interference would still be possible although the pulses will be interleaved, as will be illustrated hereinafter. That is, segments from ten different pulses may be circulating through the loop during any one pulse period.

Other loop delays are also possible. The major consideration is that a pulse, during its predetermined circulating period, must not return to the loop input at the occurrence time of a subsequent pulse. Further, the maximum number of trips through the loop consistent with good operation will usually be desirable in order to insure standardization of pulses at a uniform amplitude and attenuation of noise during spaces to substantially zero. It is, of course, necessary to take sufficiently short samples from the incoming signal, both in order to take that portion of the signal which is most representative of the original signal and also in order that the segments will be sufficiently short so that they can be recirculated through the loop as many times as desired without interference. For the present illustration, the loop delay is taken as 1.1 pulse periods and the length of the gated pulse segments is one-tenth of a period.

The gates of the present invention comprise traveling-wave amplifiers with a sinusoidally varying voltage applied between the helix and cathode. Traveling-wave amplifiers are described in articles in the February 1947 Proceedings of the I. R. E., entitled "Travelling-Wave Tubes" by J. R. Pierce and L. M. Field at page 108, "Theory of Beam-Type Travelling-Wave Tube" by J. R. Pierce at page 111, and "The Travelling-Wave Tube as an Amplifier at Microwaves" by R. Kompfner at page 124.

Figure 2C:
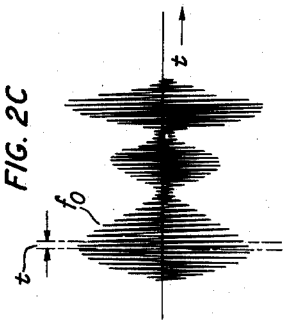
Figs. 2B through 2E show diagrams illustrative of the operation of a traveling-wave gate.
Figure 2E:
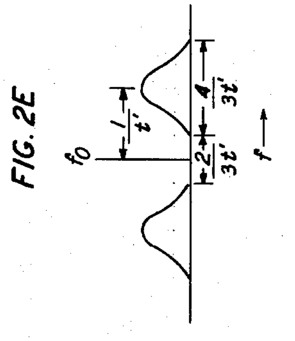
Figure 2A:
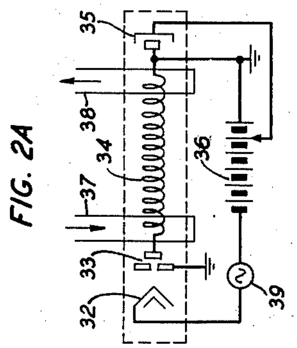
Fig. 2A shows schematically a traveling-wave tube connected as a gate.

A traveling-wave amplifier is shown schematically in Fig. 2A as comprising a cathode 32, electron gun anode 33, helix 34, and collector 35. A source of direct-current voltage 36 is connected between cathode 32 and helix 34 to bias the helix and anode positive with respect to the cathode. By way of example, the cathode-helix voltage or beam voltage may be on the order of 1500 volts. The collector 35 is usually connected, as shown, slightly less positive than the helix 34, and the gun anode 33 is biased at the same potential as the helix.

Energy to be amplified is applied to the helix by the input wave guide 37 and is taken from the remote end of the helix by the output wave guide 38. As is known, amplification of the input wave is effected by the interaction of the electron beam formed between the cathode 32 and collector 35 and the electromagnetic or traveling wave. It is also known that amplification will result only if the forward velocity of the electromagnetic wave is approximately the same as the velocity of the electrons of the electron beam. For this reason, the input beam is propagated along a helical transmission line to decrease its velocity to that of the beam electrons, which, with a beam voltage of 1500 volts, will be on the order of one-thirteenth the speed of light.

With a helix of a given pitch, the range of electron velocities and hence cathode-helix voltages over which the tube will amplify is fairly restricted. A typical gain versus cathode-helix voltage characteristic is shown in Fig. 2B. As there illustrated, the gain curve is rather sharply peaked at the optimum helix voltage which in the present illustration is taken as 1500 volts. For practical purposes, the tube will be considered cut off when its output is thirty decibels below the optimum value. Therefore, if the voltage range between the thirty-decibel down points is denoted as $v$, an effect similar to turning off the electron beam may be obtained by varying the cathode helix from its optimum value by a voltage of greater than $$\frac{v}{2}$$

This is accomplished in accordance with the present invention by superimposing a sinusoidally varying voltage on the direct-current cathode-helix voltage by the sine wave generator 39 in Fig. 2A. This sinusoidally varying voltage is illustrated in the lower portion of Fig. 2B and varies about an axis equal to the direct-current cathode-helix voltage. If the peak-to-peak voltage of the output of generator 39 is greater than $v$, the tube will act as a gate, passing energy only when the sinusoidal voltage is within the range $$\pm\frac{v}{2}$$

Since the sine wave is varying at its most rapid rate when it goes through this range of voltage, the time $t$ during which the sinusoidal control voltage is within the range $$\pm\frac{v}{2}$$

and hence the time during which the gate is open will be short relative to one period of the control voltage which it is assumed has a peak voltage $v_p$ appreciably greater than $$\frac{v}{2}$$

The time $t$ can be varied by varying the peak voltage of the sinusoidal control wave. For example, by increasing the peak control voltage $v_p$, the time $t$ will be decreased.

Figure 2D:
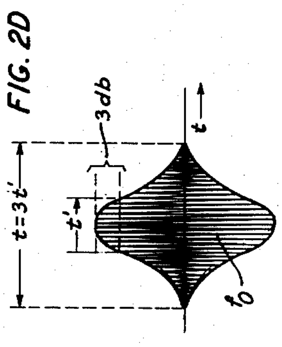
Figure 2B:
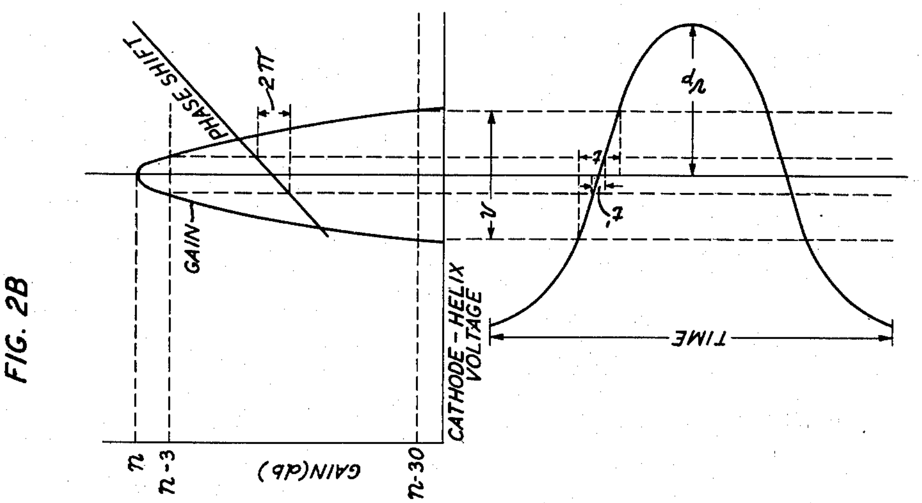

To further illustrate the action of the traveling-wave gate, it will be assumed that an input signal comprising a train of radio frequency pulses having a center frequency $f_0$, as shown in Fig. 2C, is applied to the input of the gate. If the sinusoidal gating voltage goes through the range of $$\pm\frac{v}{2}$$

in the time $t$ at the peak of each radio frequency pulse, a short burst of radio frequency energy will be amplified and gated through the tube and will appear in the output of the gate, as shown on an expanded time scale in Fig. 2D. The envelope of the output pulse will be approximately sinusoidal with a peak voltage proportional to the instantaneous amplitude of the input radio frequency energy.

It will be noted that the sinusoidal gating voltage goes through the range of $$\pm\frac{v}{2}$$

twice during each cycle of the gating voltage, both on the positive and the negative excursions of the control voltage. However, the change in the beam electron velocity due to the varying cathode-helix voltage will produce a phase shift in the output pulse due to the varying relative velocities of the traveling wave and the beam electrons. For an increasing beam voltage, namely, when the sinusoidal control voltage aids the battery 36 the phase retardation through the tube will be decreased, and for a decreasing beam voltage, the phase retardation will be increased.

It has been found that the relation between the output phase shift and the cathode-helix voltage is approximately linear and that between the three-decibel down points, the phase shift is approximately equal to $2\pi$ radians or one cycle. If the time required for the sinusoidal control wave to shift the output voltage between the three-decibel down points is $t'$, the frequency change will be $$\frac{1}{t'}$$

Since the envelope of the output pulse is approximately sinusoidal, the width of the pulse between the three decibel points will be roughly one third the width of the pulse at its base so that $t=3t'$. The frequency range or spectral width of such a pulse is $$\frac{4}{t} \text{ or } \frac{4}{3t'}$$

Similarly, the frequency shift of the center frequency $f_0$ will be $$\frac{1}{t'}$$

so that the output pulses on a frequency scale will appear as shown on Fig. 2E. The pulse of the higher frequency is the one which occurs in the positive excursions of the sinusoidal gating voltage i. e. when the gating voltage makes the helix more positive with respect to the cathode, and the pulse of the lower frequency appears during the other half cycle of the control wave. It will be noted that the spectrum of each of the output pulses is removed in frequency from the original center frequency $f_0$ by a minimum of about $$\frac{1}{3t'}$$

so that there is a frequency difference between the edges of the output spectra of $$\frac{2}{3t'}$$

This feature of the gate facilitates rejection of the unwanted pulses by filtering so that only one pulse is passed for each cycle of the control wave.

Figure 3:
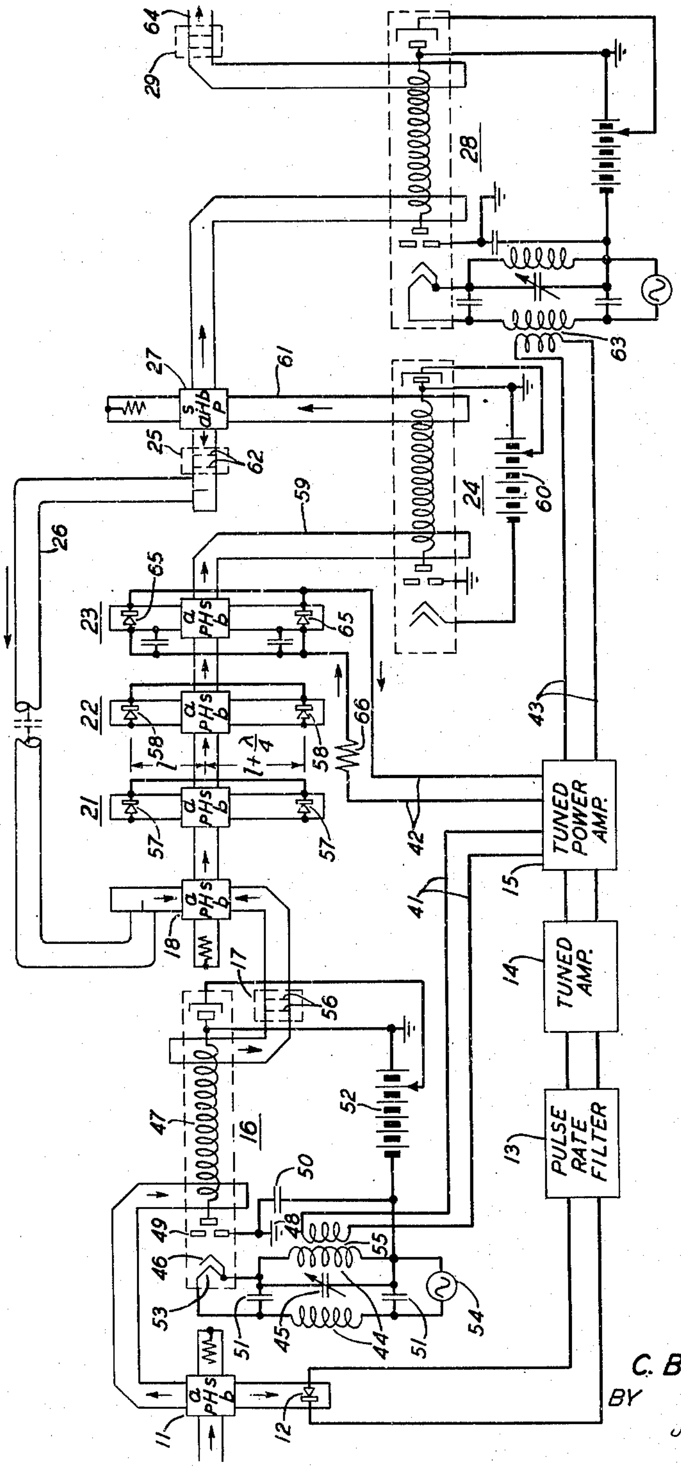
Fig. 3 is a specific repeater, in schematic, of the type shown in Fig. 1 and embodying principles of the present invention.
Figure 4:
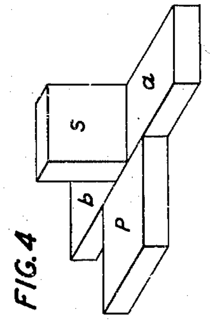
Fig. 4 is a pictorial view of a wave-guide hybrid junction.

The operation of the complete repeater will now be explained with reference to the circuit of Fig. 3 and the wave forms of Fig. 5. Input signal energy from the antenna 10 of Fig. 1, illustrated by waveform I of Fig. 5 enters the $p$-arm of hybrid junction 11. A hybrid junction is illustrated pictorially in Fig. 4 and is described in Patent 2,445,895 to W. A. Tyrrel, dated July 27, 1948. The hybrid junction illustrated in Fig. 4 comprises two pairs of conjugately related waveguide arms. One pair comprises two collinear arms designated $a$ and $b$, respectively. The other pair comprises an arm joined in the electrical plane of the collinear arms and another arm joined in the magnetic plane of the collinear arms. Since electromagnetic energy which enters the arm joined in the electrical arm will be in phase in the $a$ and $b$ arms at equal distances from the junction, the arm joined in the electrical plane is identified as the parallel or $p$-arm. Similarly, from the phase relationship of energy entering the $a$ and $b$ arms from the arm joined in the magnetic plane, this latter arm is identified as the series or $s$ arm. Due to the conjugate relationship of the arms, there is no direct coupling between the $p$ and $s$ arms or between the $a$ and $b$ arms. The hybrid junction 11 as used herein makes no especial use of the conjugacy feature but is employed merely as convenient tapping means.

The energy which enters the $p$-arm of hybrid junction 11 will therefore divide between the $a$ and $b$ arms. The $s$-arm is terminated in its characteristic impedance to absorb any energy which may be reflected into it from either the $a$ or $b$ arms. Energy entering the $b$-arm is rectified by the crystal rectifier 12 and applied to the pulse rate filter 13, which, as previously described, is a narrow band filter tuned to the nominal pulse repetition rate. The sinusoidally varying output of filter 13 is amplified by amplifier 14 and applied to the tuned power amplifier 15. The amplifier 15 produces the three sinusoidally varying control waves previously referred to, by any means well known in the art, which are each of the same frequency as the input sinusoidal wave but are displaced in time relative to each other. These three wave forms appear on the power amplifier 15 output leads 41, 42, and 43, respectively.

Energy entering the $a$-arm of hybrid junction 11 is applied to the input of traveling-wave amplifier 16 which is similar to the amplifier shown in Fig. 2A. Traveling-wave amplifier 16 has a tuned circuit comprising the parallel inductors 44 and capacitor 45 tuned to the nominal pulse repetition rate and connected between the cathode 46 and helix 47 by means of the ground 48 which is the common potential of the helix and accelerating anode 49. Capacitors 50 and 51 serve to isolate the circuits for direct current and low frequencies but are effectively short circuits at the control wave frequency. The capacitor 50 by-passes the bias supply 52. Capacitors 51 are effectively an open circuit for the low frequency voltage supplied to the heater 53 by the source 54 so that it is possible to supply the heater voltage from the source 54 by way of inductors 44.

The control voltage waveform appearing on output lead 41 is coupled into the tuned circuit by means of the link 55 and causes the cathode potential to swing positive and negative about a mean voltage equal to the cathode helix voltage supplied by battery 52. The timing of this first sinusoidally varying waveform is illustrated by waveform II of Fig. 5. As described previously, the control wave is illustrated as positive when it aids the bias supply 52 and hence increases the beam voltage. Waveform II is timed so that it passes through zero voltage on its positive excursion at the mid-period of the nominal pulse occurrence times which are indicated by the letters A, B, C, etc. Further, the amplitude of the control waveform II is adjusted so that the control wave will go through the range of $-v$ to $+v$ volts referred to in connection with Fig. 2B in a time $t$ which in the present embodiment is one-tenth of the nominal pulse period. The pulse period, as previously explained, is the time between mid-periods of the nominal pulse occurrence times.

A short segment of the input signal, equal in length to one-tenth of a pulse period and having a sinusoidal envelope is therefore amplified and gated by amplifier 16 at the mid-period of each pulse occurrence time. The pulse segments which are gated by amplifier 16 during the negative excursions of the gate-control voltage are rejected by filter 17 which comprises the two spaced irises 56. The pulse segments having the higher frequencies therefore appear in the *b*-arm of hybrid junction 18 as shown by waveform III of Fig. 5.

The pulse segments entering the *b*-arm of hybrid junction 18 pass by way of the *s*-arm thereof to the input of the expander 21. Expander 21 comprises a hybrid junction of the type shown in Fig. 4 but with the conjugate *a* and *b* arms terminated by crystal rectifiers 57. The crystals 57 provide a variable impedance termination for the wave-guide sections and control the amount of energy that is reflected by the *a* and *b* arms. One of the *a* and *b* arms, for example the *b*-arm is a quarter of a wavelength longer than the other $$\left(l+\frac{\lambda}{4}\right)$$

so that the energy is reflected from the *a* and *b* arms into the *s*-arm in an additive manner.

Figure 6:
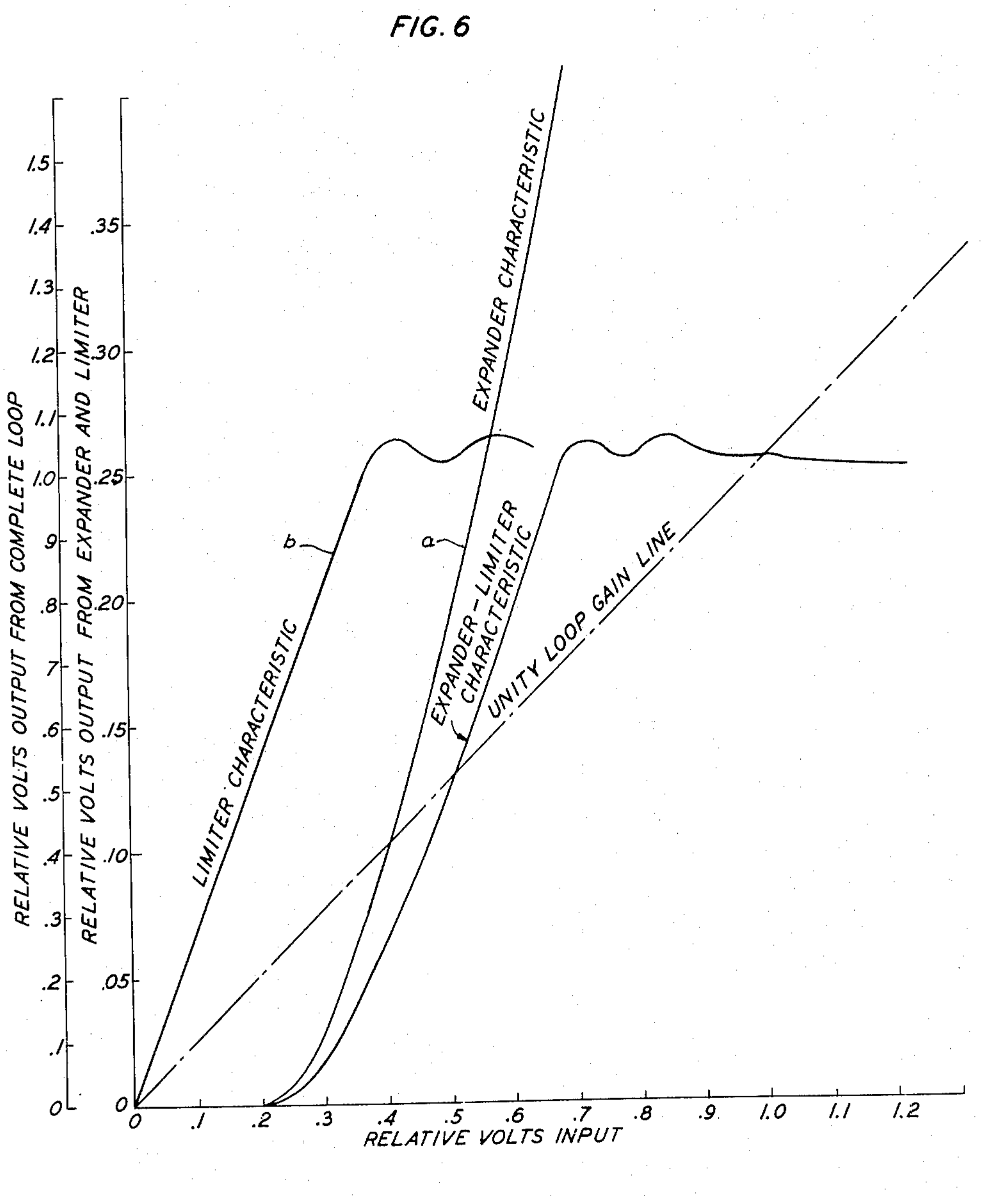
Fig. 6 shows characteristic curves of an expander and a limiter, both individually and combined.

An expander characteristic is shown as curve *a* of Fig. 6 and is obtained by matching the impedance of the crystals 57 to the impedance of their corresponding wave-guide arms at a low signal amplitude. This results in substantially no reflection of the low levels from the *a* and *b* arms and hence relatively high attenuation of such signals. As the input signal level increases the *a* and *b* arms will become progressively mismatched due to the non-ohmic resistance characteristic of crystal rectifiers so that the higher levels will be more completely reflected. The level at which the crystals are matched to their respective wave-guide sections is controlled by impedance matching devices in a well-known manner. An expander of the type described is disclosed in a copending application of C. C. Cutler Serial No. 118,890 filed September 30, 1949.

The expanded output from the *s*-arm of the expander is applied to the input of the limiter 22 which is structurally similar to the expander 21. However, the crystal rectifiers 58 of the limiter are matched to their respective arms at a predetermined high level to limit the amplitude of the pulse segments to the desired standard amplitude. A limiter characteristic is shown as curve *b* of Fig. 5. The net effect of the expander and limiter is illustrated by the combined expander-limiter characteristic shown as curve *c* of Fig. 5. At lower signal level the action of the expander predominates while the limiter prevents the higher levels from exceeding a predetermined peak amplitude which is herein referred to as unity standard amplitude. A limiter of the type described is disclosed in a copending application of A. F. Dietrich Serial No. 118,856 filed September 30, 1949.

As previously mentioned it is desired to reduce all pulse segments of less than one-half of a standard amplitude to zero so that a space will result and to increase all pulse segments of greater than one-half standard amplitude to unity standard amplitude, or to limit them to this value if previously greater. Thus, a pulse of exactly one-half standard amplitude should remain unchanged by the loop and hence controls the loop gain.

The output of limiter 22 is applied to the blanking gate 23 which, for the present, will be assumed to be an open gate. The expanded and limited pulses are therefore applied by wave guide 59 to the input of traveling-wave amplifier 24. Amplifier 24 is biased in the normal manner for amplification by the battery 60 and its gain is adjusted to compensate for the losses in the loop so that a pulse of one-half standard amplitude will return to the input of the loop unchanged in amplitude. This may be better understood by reference to Fig. 6.

The curves of Fig. 6 have been plotted with a double ordinate. The right-hand ordinate indicates the relative output of only the expander and/or limiter. The left-hand ordinate indicates the relative output of the complete loop and includes the amplification introduced by amplifier 24 as well as the distributed losses in the loop. It may be seen that the unity loop gain line intersects the combined expander-limiter characteristic at one-half standard amplitude relative input indicating that a pulse of this amplitude will theoretically circulate unchanged. In a practical case, small variations will change such a pulse sufficiently to cause it to go one way or the other.

From the characteristic of the complete loop, it may be seen that the loop gain is reduced below unity as the signal level decreases below one-half standard amplitude. For pulses of greater than one-half standard amplitude, the loop has a gain of greater than unity as long as the pulses do not exceed the limit set by the limiter 27. For the characteristic shown, the loop gain increases as the input level approaches .7 unit of standard amplitude at which level the limiter prevents any appreciable further increases. Inputs of greater than .7 unit reappear at the expander 21 input with unity standard amplitude.

The amplified and partially reshaped pulses appearing in wave guide 61 are returned to the input of expander 21 by way of the *p* and *a* arms of hybrid junction 27, the filter 25 comprising the spaced irises 62, the coaxial line 26', and the *a* and *s* arms of hybrid junction 18. The total delay of the loop is controlled by cutting the coaxial line 26 to the proper length which in the present illustrative case would be sufficient to give the loop a total delay of 1.1 periods.

Part of the power applied to hybrid junction 27 is applied by way of the *b*-arm of the hybrid to the input of traveling-wave amplifier 28 which is similar to the input gated amplifier 16. The sinusoidally varying control waveform appearing on output leads 43 of the tuned amplifier 15 is coupled into the tuned circuit of the output amplifier 28 by the link 63. This control waveform is illustrated as waveform VII of Fig. 5. Control waveform VII is timed with reference to the pulse occurrence times so that it will pass through zero voltage on its positive excursion only when a pulse which has made five trips through the expander 21 appears in hybrid junction 27. The pulses appearing in hybrid junction 27 have not been delayed by delay circuit 26 and therefore, on a time scale, appear as shown in waveform VI of Fig. 5. The control waveform VII is delayed relative to the control waveform II by the same amount that the circulating pulses are delayed in passing from hybrid junction 18 to hybrid junction 27 plus a further delay equal to the fractional period of delay incurred by making five trips through the loop. As with the input gate 16, the unwanted pulse segments gated by amplifier 28 are rejected by the output filter 29. The pulses which have made their predetermined number of trips through the loop will be passed and reshaped by filter 29 and appear in the output wave guide 64 as illustrated in waveform IX of Fig. 5.

Even though a pulse is gated out of the loop a portion of it will continue to circulate in the loop and if not removed will eventually interfere with subsequent pulses. It is the purpose of the blanking gate 23 to remove such pulses from the loop. The blanking gate comprises a hybrid junction with its *a* and *b* arms terminated in crystal rectifiers 65, which structure is similar to the structure of both the expander 21 and limiter 22. The sinusoidally varying control wave V of Fig. 5 which appears on output leads 42 is applied through resistor 66 to the rectifiers 65 as a biasing current. This bias varies the impedance of the rectifiers due to their non-ohmic characteristic and hence varies the impedance termination of the hybrid *a* and *b* arms. When the wanted pulse segments pass through the gate 23, it is important that the gate present a substantially constant low loss to the incident energy. Also when the unwanted pulses are present in the gate, it is desired that the gate present a high loss to incident energy so that the unwanted pulse will be attenuated sufficiently in several trips to be effectually removed from the loop.

Due to the sinusoidally varying bias, the transition from a high loss state to a low loss state and vice versa is necessarily gradual with periods of intermediate attenuation of varying degrees. If several circulating periods are reserved for attenuation, it is more important that a constant low loss be presented to the wanted pulses than a constant high loss be presented to the unwanted pulses.

Figure 7:
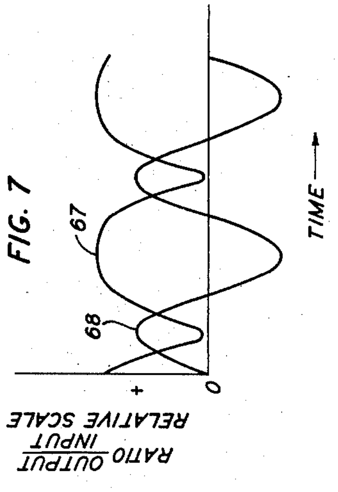
Fig. 7 is a diagram descriptive of the operation of the hybrid gate in Fig. 3.

In the present illustrative example, the incoming pulse segments are circulated through the expander and limiter five times before being gated into the output. Referring now to Fig. 7 the current, whose positive direction of flow is indicated by the arrows, and which is applied to the rectifier 65 of Fig. 3 biases the rectifiers during the entire negative half-cycle so as to greatly mismatch their associated wave-guide arms and hence reflect substantially all incident energy for a like period. The relative output to input ratio of the pulse segments passed by the gate 23 is indicated by the dotted line curve 67 as the control current 68 varies. The transition to a high loss begins to take effect only after the control current has swung positive. The attenuation reaches a maximum at the positive peak of the control wave at which voltage the rectifiers are biased to substantially the characteristic wave guide impedance. Since a pulse segment may circulate through the loop five times after it has been gated out of the loop, it will be evident that during one of these five trips, the unwanted segment will be subjected to the peak attenuation condition and that it will be substantially removed from the loop before it can interfere with a subsequent pulse.

Since the structure of the blanking gate is similar to that of the expander and limiter, either of the latter may be connected to perform the blanking function as well as their normal function. However, if the blanking gate is inserted in the loop where the signal level is lowest, it will be least affected by variations in pulse amplitudes and will hence tend to act as a gate rather than an expander or limiter.

The timing and reshaping of the pulse segments will now be explained with particular reference to Fig. 5. A sample of the input wave, waveform I is taken at the mid-period of the nominal pulse occurrence time under the control of the sinusoidal voltage, waveform II which opens the input gate. The gated segments appearing in the *b* arm of hybrid junction 18, waveform III, are proportional in amplitude to the amplitude of the signal wave and are one-tenth of a pulse period in duration.

The pulse segments appearing in the *s* arm of hybrid junction 18 are shown as waveform IV. The segments have been lettered and some shaded to facilitate identification as their progress is traced through the loop. The first gated pulse segment, pulse A, is just greater than the slicing level which is the half standard amplitude previously referred to. Assuming that its actual magnitude is .51 unit, it may be seen from the loop characteristic of Fig. 5 that after one trip through the expander, limiter, and amplifier, pulse A will reappear after a delay of 1.1 pulse periods at the input of expander 21 as a pulse of .52 unit. This pulse is indicated on waveform IV as pulse $A_1$, the subscript denoting the number of trips completed through the loop. A second trip will increase the pulse to .545 unit as indicated at $A_2$ and a third trip will increase the segment to .62 unit as shown by $A_3$. The fourth trip will increase the pulse to .83 unit and a fifth trip will bring it to the standard amplitude of one unit as shown at $A_4$ and $A_5$ respectively.

Pulse segment B is substantially less than .5 unit and is attenuated to zero on the second trip through the expander. Pulse C has an amplitude of .49 unit and is not removed until after the fourth trip through the loop. Pulse D is exactly unity amplitude and circulates unchanged. Pulse F is greater than unity amplitude and after being limited to one unit on its first trip through the loop, circulates as a pulse of standard amplitude. Thus, with an expander characteristic as shown in Fig. 6, five trips through the expander will be sufficient in most cases to either return pulses to standard amplitude or to attenuate noise during spaces to zero.

Figure 5:
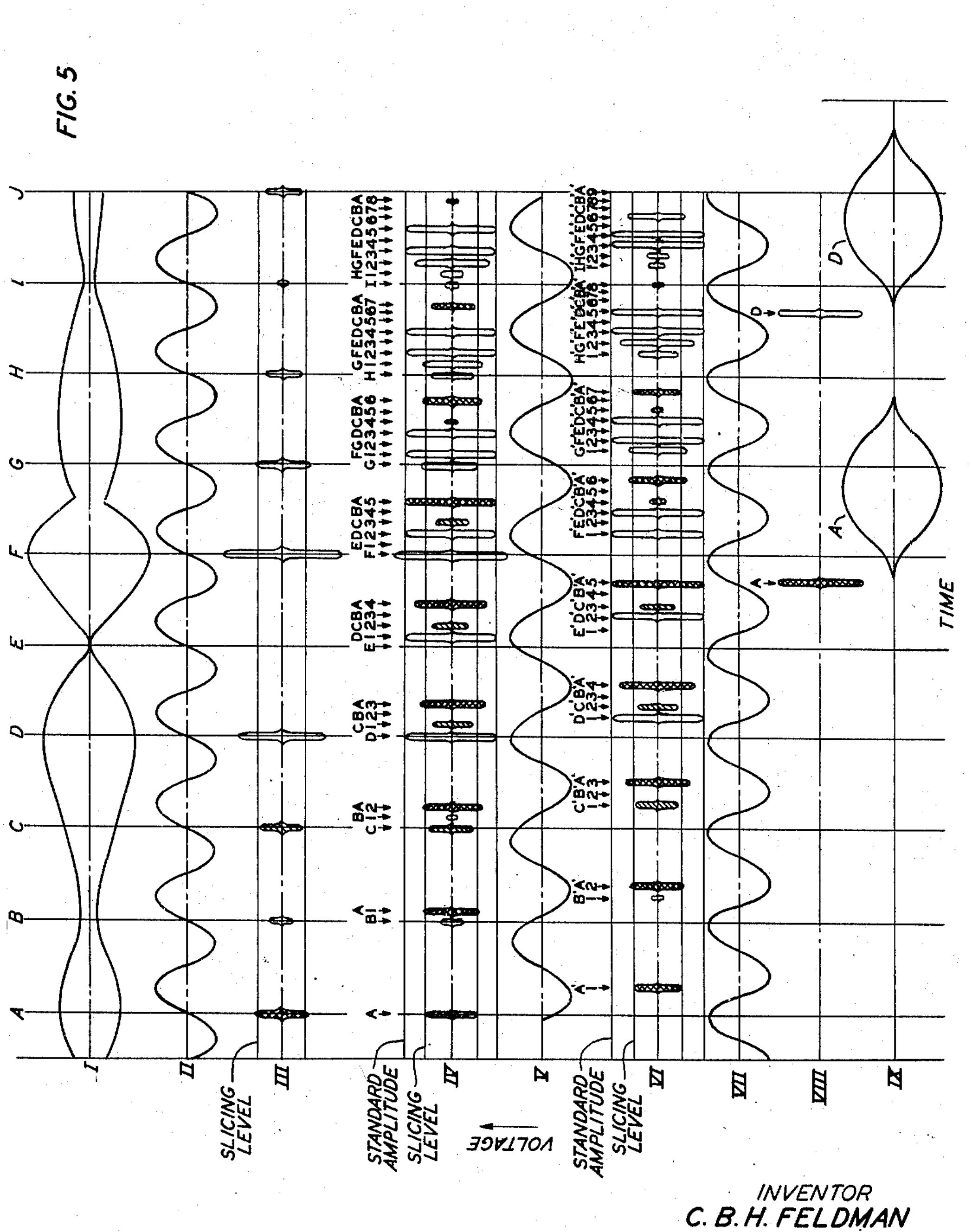
Fig. 5 shows wave forms illustrative of the circuit of Fig. 3.

The envelope of the pulses appearing at hybrid junction 27 are shown as waveform VI of Fig. 5. These pulses have not been delayed by delay line 26 but only by amplifier 24 and associated wave guide which fact is indicated by the primes imposed on the pulse designations. The timing of the control wave of waveform VII is determined from the delay between hybrid junction 18 and hybrid junction 27 and the relative location in a pulse period of a pulse segment which has completed its predetermined number of useful trips through the loop. In the illustrative example, the delay between hybrid junctions 18 and 27 is .25 pulse period. Further since the loop delay is equal to 1.1 periods and each pulse makes five reshaping trips through the expander, a pulse segment is gated from the loop on the trip which it commences centered at .4 unit of a pulse period that is, 5.4 periods after having entered hybrid junction 18. The sinusoidal control waveform VII which opens the output gate is therefore delayed .4 plus .25 or .65 unit of a pulse period with respect to the control waveform I which opens the input gate. This may readily be seen from the waveforms of Fig. 5.

The segments gated by output gate 28 are shown in waveform VIII and after shaping by filter 29 appear as shown in waveform IX.

It will be noted that the incoming pulses are not only reshaped but also accurately retimed. Even though the shapes of consecutive incoming pulses may vary from pulse to pulse the frequency of the output of the timing circuit comprising the rectifier 12, filter 13 and amplifiers 14 and 15 will change only in response to slow variations in the pulse repetition rate so that those pulses whose peaks have been shifted slightly from their nominal occurrence time will be returned to their proper occurrence time relative to the other pulses as is shown by waveform IX of Fig. 5. Also the timing circuit is designed to have sufficient "flywheel" effect so that the control waveforms will be uninterrupted even though no pulses are received for several periods.

It will also be noted that the repeater in the disclosed embodiment shifts the center frequency of the incoming pulses by an amount $$\frac{2}{t'}$$

due to the frequency shifts induced by the input gate $$16\left(+\frac{1}{t'}\right)$$

and the output gate $$28\left(+\frac{1}{t'}\right)$$

If it is desired to repeat the signal wave without a shift in the radio frequency content, either the control wave II which operates the input gate or the control wave VII which operates the output gate may be shifted in phase 180 degrees, and, by adjusting the associated filter 17 or 29 to select only the pulse gated by the negative going swing of the control wave, the net frequency change in the repeater will be approximately zero.

Although the invention has been described with particular reference to a specific embodiment numerous other modifications will readily occur to one skilled in the art without departing from the spirit or scope of the invention. Further, the invention is not limited in its application to pulse repeaters; for example, it may be applied to terminal, testing or other radio equipment wherein it is desired to periodically sample a signal wave.

What is claimed is:

1. In a pulse-shaping circuit for periodic pulses comprising pulse regenerator means having an input and an output and means for circulating pulses applied to said input through said regenerator, means for gating said periodic pulses to obtain narrow segments therefrom which comprises a traveling-wave amplifier having a helix and a cathode, said amplifier also having an input and an output, means for applying said periodic pulses to the input of said amplifier, direct-current biasing means connected between said cathode and said helix to form a stream of electrons which flows from said cathode along said helix, a source of voltage varying in a regularly recurrent manner, means to impress said varying voltage on said direct-current bias, means connecting the output of said amplifier to the input of said regenerator, and means connected to the output of said pulse regenerator to gate pulses out of said regenerator.

2. The combination according to claim 1 wherein said last-named gating means comprises a second traveling-wave amplifier having a helix and a cathode, said second amplifier also having an input and an output, direct-current biasing means connected between the said cathode and said helix of said second traveling-wave amplifier to form a stream of electrons which flows from said cathode along said helix, a source of voltage varying in a regularly recurrent manner, means to impress said varying voltage on the said direct-current bias of said second traveling-wave amplifier and means connecting the output of said pulse regenerator to the input of said second traveling-wave amplifier.

3. The combination in a system for the transmission of intelligence by signals modulated by recurrent pulses and spaces wherein said pulses may become distorted and said spaces may be replaced by an appreciable noise signal of means for reshaping said pulses and attenuating said noise and gating means for introducing short segments of said modulated signals into said reshaping means, said gating means comprising a traveling-wave amplifier having a cathode and a helix, an input and an output for said amplifier, means for applying said modulated signals to the input of said amplifier, a source of sinusoidally varying voltage connected between said cathode and said helix and means connecting the output of said amplifier to the input of said reshaping means.

4. The combination in accordance with claim 3 and said sinusoidal voltage having a range of instantaneous values such that said amplifier will be biased at the optimum value for amplification for a relatively small portion of a cycle of said sinusoidal voltage.

5. The further combination in accordance with claim 4 and means responsive to said modulated signals to derive a voltage which varies at the average pulse repetition rate, and means to synchronize said source with said last-named voltage.

6. In a system for transmitting signal waves modulated by recurrent pulses and spaces, a pulse shaping circuit having an input and an output and comprising an expander, a limiter, and an amplifier connected in series in a closed loop, an input gate and an output gate connected, respectively, to the input and output of said circuit, means to apply said signals to said input gate, means responsive to said signals to derive a voltage which varies in a sinusoidal manner at the average pulse repetition rate of said modulated signal waves, said input and output gates each comprising a traveling-wave amplifier having electron beam forming means and an input and an output, and means to apply said voltage to said electron beam forming means to vary the velocity of the electrons in said beam at said average pulse repetition rate.

7. In a system for transmitting signal waves modulated by recurrent pulses and spaces, a loop circuit comprising an expander, an amplifier, and a limiter connected in series therein and having an input and an output, a first gating means connected to said input comprising a first traveling-wave amplifier having electron beam forming means and an input and an output, means to apply said signal waves to the input of said first traveling-wave amplifier, a second gating means connected to the output of said loop circuit comprising a second traveling-wave amplifier having electron beam forming means and an input and an output, means responsive to said signal waves to derive two voltages which vary in frequency at the average pulse repetition rate and are of a predetermined phase relative to the nominal pulse occurrence times, means to apply one of said voltages to the electron beam forming means of said first traveling-wave amplifier to vary the velocity of the electrons in the beam of said first amplifier, and means to apply the other of said voltages to the electron beam forming means of said second traveling-wave amplifier to vary the velocity of the electrons in the beam of said second traveling-wave amplifier.

8. In a system for the transmission of signal waves modulated by recurrent pulses and spaces, a circulating pulse regenerator having an input and an output and comprising a loop circuit having connected in series therein means to increase the amplitude of all pulses greater than a predetermined amplitude relative to the amplitude of all other pulses, amplifier means, and means to limit the maximum amplitude of circulating pulses, a first gating means connected to the input of said regenerator comprising a first traveling-wave amplifier having an input and an output, means to form an electron beam in said first traveling wave amplifier, means to apply said signal waves to the input of said first traveling wave amplifier, a second gating means comprising a second traveling-wave amplifier, having an input and an ouput, connected to the output of said regenerator, means to form an electron beam in said second traveling-wave amplifier, a timing circuit comprising means responsive to said signal waves to derive two voltages varying sinusoidally at the average pulse repetition rate which are of a predetermined phase relative to the nominal pulse occurrence time, means to apply one of said voltages to the electron beam forming means of said first traveling-wave amplifier to vary the velocity of the electrons in the beam of said first amplifier, and means to apply the other of said voltages to the electron beam forming means of said second tranveling-wave amplifier to vary the velocity of the electrons in the beam of said second amplifier.

9. The combination in accordance with claim 8, wherein said timing circuit comprises means responsive to said signal waves to derive three voltages varying sinusoidally at the average pulse repetition rate which are of a predetermined phase relative to the nominal pulse occurrence times, voltage responsive variable attenuation means connected in said loop circuit, and means to apply the third of aid voltages to said voltage responsive means to control said attenuation.

10. The combination in accordance with claim 9, wherein said variable attenuation means comprise a hybrid wave-guide junction having two of its conjugately related arms terminated by crystal rectifiers, one of said two arms being a quarter of a wave-length longer than the other, and wherein the said third voltage is applied to said crystals as a bias.

11. A pulse shaping circuit for recurrent pulses which comprises means to receive said recurrent pulses, a timing circuit comprising means to produce a plurality of sinusoidally varying voltages of a frequency determined by the repetition rate of input pulses, means to apply said recurrent pulses to said timing circuit, gating means under control of a first of said sinusoidal voltages to gate said recurrent pulses to obtain narrow segments therefrom, means to also apply said recurrent pulses to said gating means, pulse regenerator means having an input and an output and means for circulating pulses applied to said input through said regenerator and comprising means to reshape said segments and a wave-guide hybrid junction having two of its conjugately related arms terminated in crystal rectifiers, one of said two arms being an odd integral multiple of a quarter of a wavelength longer than the other, means to apply a second of said sinusoidal voltages to said crystals as a bias, means to apply said narrow segments to the input of said regenerator means, and an output gate under control of a third of said sinusoidal voltages connected to the output of said regenerator means.

12. A radio repeater for signal waves modulated by recurrent pulses and spaces which comprises a first traveling-wave amplifier having an electron beam and an input and an output, means to apply said signal waves to said amplifier, a timing circuit comprising means to generate a plurality of sinusoidally varying voltages having a frequency equal to the average repetition rate of input pulses, means to also apply said signal wave to said timing circuit, means to apply a first of said sinusoidal voltages to said first amplifier to vary the voltage of the electron beam thereof to render said amplifier alternately operative and inoperative, means comprising said timing circuit to time the occurrence of said first voltage to cause the electron beam voltage of said first amplifier to substantially equal the optimum value for amplification once each cycle at the mid-period of the nominal pulse occurrence time of said recurrent pulses at said amplifier, a pulse shaping circuit having an input and an output and comprising means to increase the amplitude of all energy greater than a predetermined amount relative to all other energy, a limiter, and an amplifier connected in series in a closed loop, means to inject the output of said first amplifier into said pulse shaping circuit, a second traveling-wave amplifier having electron beam forming means and an input and an ouput, means connecting the input of said second amplifier to the output of said pulse shaping circuit to receive energy therefrom, means to apply a second of said sinusoidal voltages to said second amplifier to vary the voltage of the electron beam thereof to render said second amplifier alternately operative and inoperative, means comprising said timing circuit to time the occurrence of said second voltage to cause the electron beam voltage of said second amplifier to substantially equal the optimum value for amplification once each cycle substantially simultaneously with the occurrence at the input of said second traveling wave amplifier of a pulse segment which has circulated through said loop for a predetermined number of trips, and transmission means connected to the ouput of said second traveling wave amplifier.

CARL B. H. FELDMAN.

REFERENCES CITED

The following references are of record in the file of this patent:

UNITED STATES PATENTS

| Number | Name | Date |
|---|---|---|
| 2,412,995 | Levy | Dec. 24, 1946 |

OTHER REFERENCES

Experimental Studies of a Remodulating Repeater by W. M. Goodall, Proc. I. R. E., vol. 36, pp. 580-583, May 1948.

The Traveling Wave Tube as Amplifier at Microwaves by Rudolf Kompener, Proc. I. R. E., pages 124 to 127, February 1947.

Traveling Wave Tubes by Pierce and Field, Proc. I. R. E., pages 109 to 111, February 1947.